(12) United States Patent
Gaudet

(10) Patent No.: US 10,208,828 B2
(45) Date of Patent: Feb. 19, 2019

(54) HYDRAULIC DAMPER

(71) Applicant: GAUDET MACHINE WORKS INC., Bainsville (CA)

(72) Inventor: Martin Gaudet, Bainsville (CA)

(73) Assignee: GAUDET MACHINE WORKS INC., Bainsville (CA)

( * ) Notice: Subject to any disclaimer, the term of this patent is extended or adjusted under 35 U.S.C. 154(b) by 441 days.

(21) Appl. No.: 14/653,493

(22) PCT Filed: Dec. 20, 2013

(86) PCT No.: PCT/CA2013/001081
§ 371 (c)(1),
(2) Date: Jun. 18, 2015

(87) PCT Pub. No.: WO2014/094140
PCT Pub. Date: Jun. 26, 2014

(65) Prior Publication Data
US 2015/0345585 A1    Dec. 3, 2015

Related U.S. Application Data

(60) Provisional application No. 61/740,041, filed on Dec. 20, 2012, provisional application No. 61/845,544, filed on Jul. 12, 2013.

(51) Int. Cl.
*F16F 9/512* (2006.01)
*F41C 23/08* (2006.01)
(Continued)

(52) U.S. Cl.
CPC .............. *F16F 9/512* (2013.01); *F16F 9/16* (2013.01); *F16F 15/0237* (2013.01);
(Continued)

(58) Field of Classification Search
CPC ................................. F41C 23/08; F16F 9/512
See application file for complete search history.

(56) References Cited

U.S. PATENT DOCUMENTS 2,465,429 A * 3/1949 Bryson .................... B04B 9/12
                                                    210/363
2,471,294 A * 5/1949 Watts ..................... B64C 25/60
                                                    188/313
(Continued)

FOREIGN PATENT DOCUMENTS

DE      3738716 A1    9/1988
EP      0222351 A2    5/1987
(Continued)

OTHER PUBLICATIONS

Supplementary European Search Report for Application No. EP13864416, dated Sep. 27, 2016.
(Continued)

*Primary Examiner* — Troy Chambers
*Assistant Examiner* — Bridget A Cochran
(74) *Attorney, Agent, or Firm* — Norton Rose Fulbright Canada LLP

(57) ABSTRACT

A compensating damper comprises opposed working end faces (1788), a hermetically sealed chamber between the working end faces, and a set of plates (1701) in the chamber with a film of viscous fluid between each pair of adjacent plates. The damper has at least two different film thickness zones across the set of plates, each of the different film thickness zones providing a different resistance response when acted upon by an outside force exerted on at least one of the opposed working end faces. Multiple internal guide pins (1723) may extend axially from the opposed working end faces for engaging the plate stack partially from each of said working end faces to increase the stroke while provid- (Continued)

ing for a compact damper. The plates may have a conical configuration to providing dampening in different plans.

3 Claims, 19 Drawing Sheets

(51) Int. Cl.
    *F41C 23/06*     (2006.01)
    *F16F 9/16*     (2006.01)
    *F16F 15/023*     (2006.01)
    *A42B 3/12*     (2006.01)
    *F16F 7/00*     (2006.01)

(52) U.S. Cl.
    CPC .............. *F41C 23/06* (2013.01); *F41C 23/08* (2013.01); *A42B 3/12* (2013.01); *F16F 7/003* (2013.01)

(56) References Cited

U.S. PATENT DOCUMENTS

| | | | | | |
|---|---|---|---|---|---|
| 2,483,430 | A * | 10/1949 | Pierce | B64C 25/60 | 137/513.3 |
| 2,587,016 | A * | 2/1952 | Watts | B64C 25/60 | 138/43 |
| 2,916,307 | A * | 12/1959 | Peters | F16F 7/01 | 188/268 |
| 3,744,599 | A * | 7/1973 | Tresch | F16F 9/08 | 188/298 |
| 3,856,242 | A * | 12/1974 | Cook | F16F 1/32 | 248/548 |
| 3,980,016 | A * | 9/1976 | Taylor | B30B 15/061 | 100/295 |
| 4,186,569 | A * | 2/1980 | Aumann | E21B 17/07 | 175/321 |
| 4,276,947 | A * | 7/1981 | Hebel | F16F 1/32 | 175/321 |
| 4,523,664 | A * | 6/1985 | Soubry | A62B 1/12 | 182/233 |
| 4,558,628 | A * | 12/1985 | Bosshard | F41A 3/94 | 188/268 |
| 4,612,429 | A * | 9/1986 | Milianowicz | F16F 7/00 | 200/288 |
| 4,765,600 | A * | 8/1988 | Hartel | F16F 13/30 | 267/122 |
| 4,773,632 | A * | 9/1988 | Hartel | F16F 13/30 | 267/140.15 |
| 5,094,328 | A * | 3/1992 | Palmer | F16D 37/008 | 188/274 |
| 5,286,013 | A * | 2/1994 | Seymour | F16F 9/103 | 188/316 |
| 5,947,458 | A * | 9/1999 | Rhodes | B60G 17/0424 | 267/140.13 |
| 5,979,618 | A * | 11/1999 | Sieg | B64C 27/51 | 188/322.19 |
| 6,095,923 | A * | 8/2000 | Kageyama | F16C 3/02 | 464/24 |
| 6,250,441 | B1 * | 6/2001 | Shimoda | F16F 9/103 | 188/322.5 |
| 2004/0173422 | A1 * | 9/2004 | Deshmukh | F16F 9/003 | 188/267.2 |
| 2007/0193839 | A1 * | 8/2007 | Nakajima | F16F 9/535 | 188/267.2 |
| 2008/0000739 | A1 * | 1/2008 | Behmenburg | B60G 17/08 | 188/322.15 |
| 2012/0180200 | A1 * | 7/2012 | Gaudet | A42B 3/121 | 2/411 |

FOREIGN PATENT DOCUMENTS

| | | |
|---|---|---|
| EP | 0837261 A1 | 4/1998 |
| EP | 1855000 | 11/2007 |
| JP | 60065925 | 4/1985 |
| JP | 60125433 | 7/1985 |

OTHER PUBLICATIONS

International Search Report of corresponding PCT application No. PCT/CA2013/001081, dated Apr. 10, 2014.

* cited by examiner

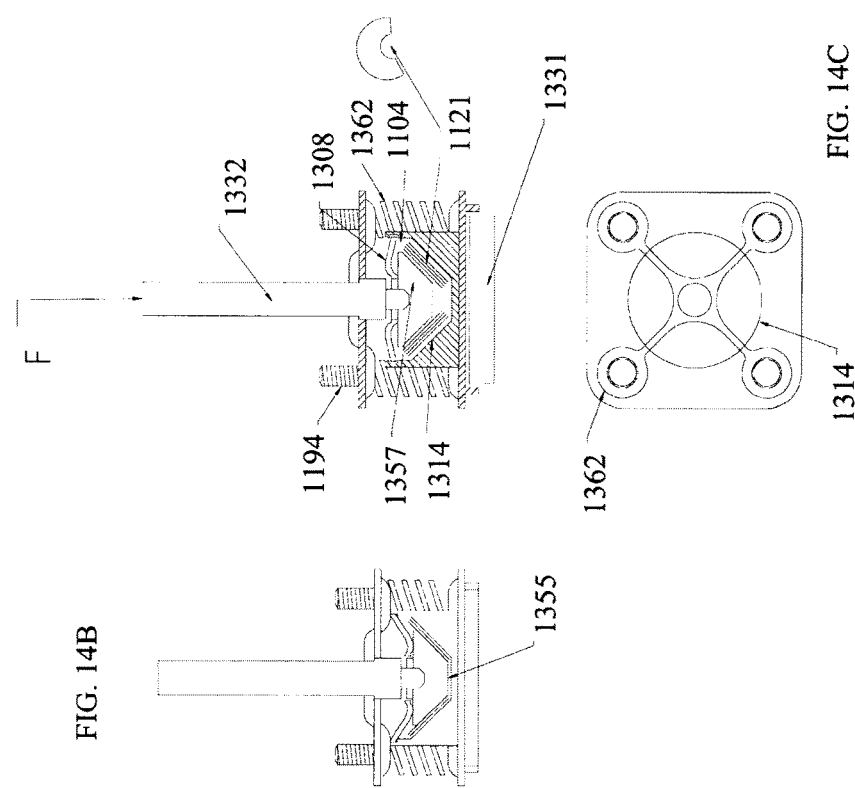

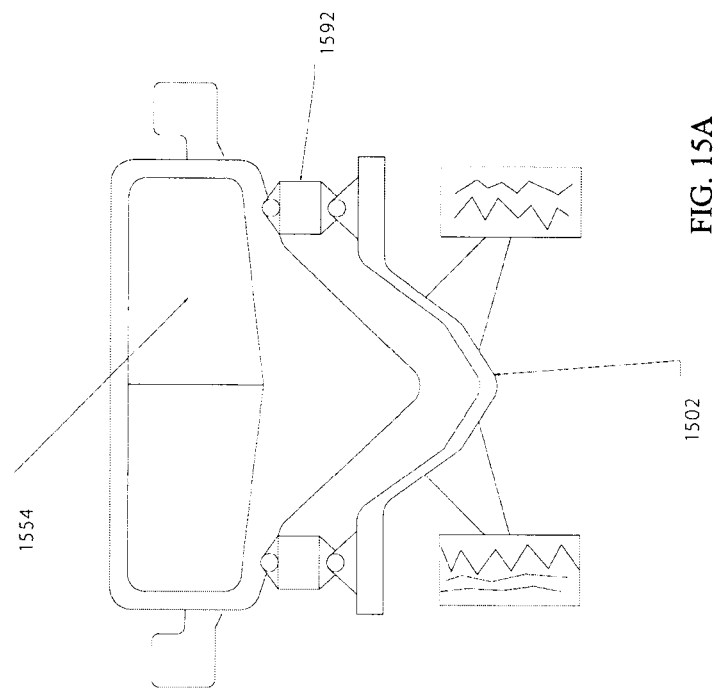
FIG. 15A
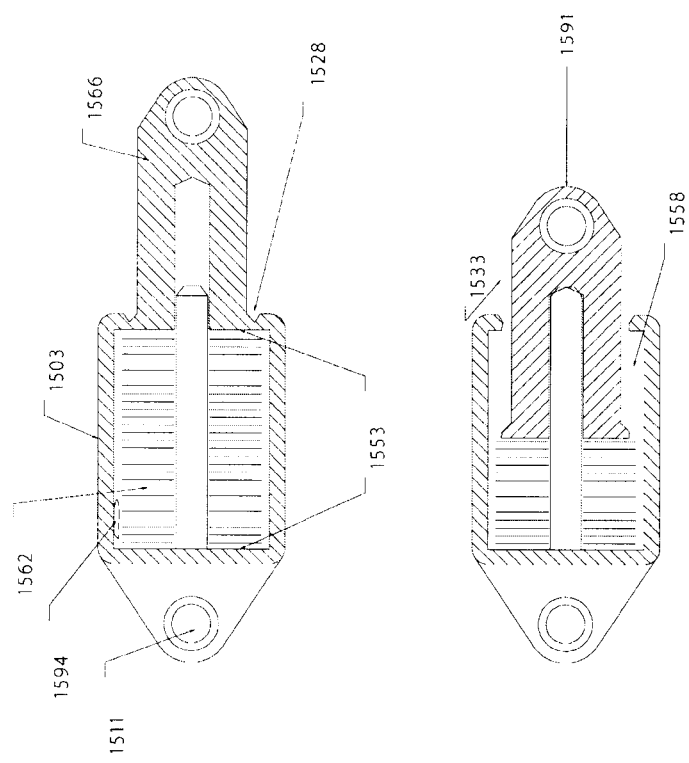
FIG. 15B
FIG. 15C

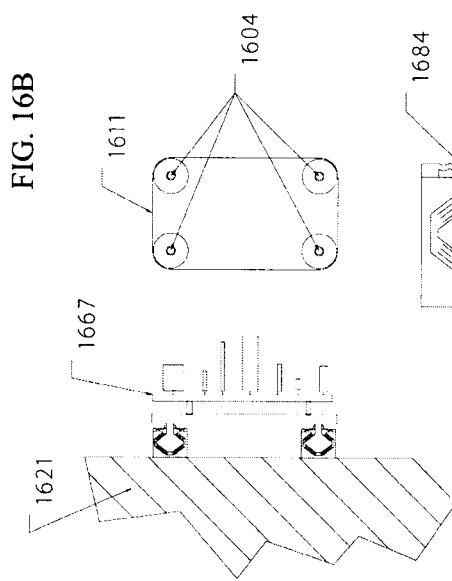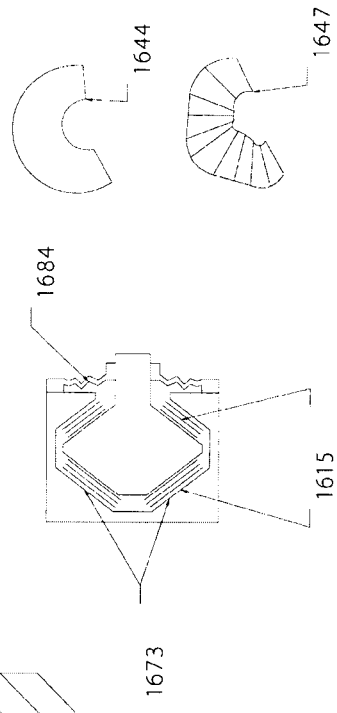

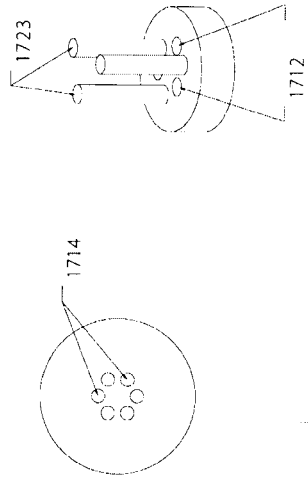
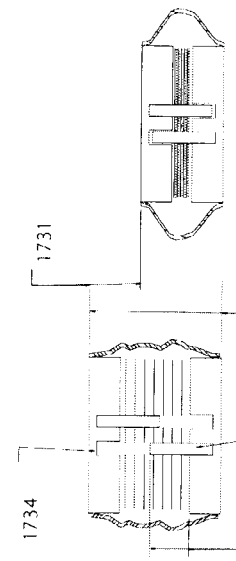
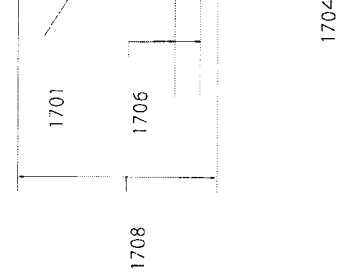
FIG. 17D
FIG. 17E
FIG. 17A
FIG. 17B
FIG. 17C

HYDRAULIC DAMPER

TECHNICAL FIELD

The application relates generally to force limiting devices, such as dampers or hydraulic cushions, suited for absorbing or dissipating energy through the flow of a fluid.

BACKGROUND ART

Energy absorbing devices are used in various applications. Over the years, various types of such devices have been developed. However, it has always been challenging to design a device that has the ability of efficiently dissipating high frequency, high force and low amplitude oscillations of short duration. Also, commercially available energy absorbing devices have a relatively limited range of applicability.

There thus remains room for improvements.

SUMMARY

In accordance with a first aspect of the present application, there is provided a compensating damper comprising opposed working end faces, a hermetically sealed chamber between the working end faces, a set of plates in the chamber with a film of viscous fluid between each pair of adjacent plates, characterized in that there being at least two different film thickness zones across the set of plates, each of the different film thickness zones providing a different resistance reponse when acted upon by an outside force exerted on at least one of said opposed working end faces.

In accordance with a second aspect, there is provided a compensating damper comprising a set of plates distributed along an axis and received in a chamber containing a working fluid, each plate having a working face generally normal to said axis, said working face having an effective surface area, each plate at rest being axially spaced from an adjacent plate by an inter-plate gap filled by the working fluid, each individual plate forming a piston for working on the volume of the working fluid between it and the next plate, the plates being axially movable towards and away from each other, at least a portion of the working fluid being squeezed out from between the plates in response to an axial compressive load transferred to the set of plates, wherein the chamber has opposed end working faces generally normal to the axis, the set of plates being disposed between said working end faces, and multiple internal guide pins extending axially from the opposed working end faces and engaging the plate stack partially from each of said working end faces.

In accordance with a third aspect, there is provided a compensating damper comprising an arrangement of plates contained in a chamber filled with a viscous fluid, the arrangement of plates comprising an array of conical plates nested into one another with a film of viscous fluid between adjacent plates, the conical shape of the plates providing dampening in more than one geometric plane at once.

In accordance with a still further aspect, there is provided a compensating damper energy dissipating link, comprising a sealed canister holding a stack of fluid filled plates and with an external tubular structural wall providing sufficient structural strength to allow the canister to act as a solid mounting link, a pair of working faces between which the stack of fluid filled plates is held, a joint at a first end of the canister to permit mounting of the link and a rod type arrangement projecting from a second end of the canister, a weak point between the rod type arrangement and the second end to cause a stress concentration point to fracture when a force exceeding the normal operation is encountered, thereby allowing the rod to be run into the canister and provide access to the dampening action.

Further details of these and other aspects of the present invention will be apparent from the detailed description and figures included below.

DESCRIPTION OF THE DRAWINGS

Reference is now made to the accompanying figures, in which:

FIGS. 14a, b and c show the adaptation of an embodiment of a compensating damper in machine vibration isolation bases;

FIGS. 15a, b and c show the integration of an embodiment of a compensating damper into energy dissipating mounting links of a military vehicle for reducing the force which occupants of the military vehicle may be subjected to during the encounter with Improvised Explosive Devices (IEDs), explosions or land mines;

FIGS. 16a to 16e illustrate a vibration isolation base to protect sensitive electronic equipment;

FIGS. 17a to 17e illustrate a further embodiment of a force limiting device including multiple internal guiding pins.

DETAILED DESCRIPTION OF THE PREFERRED EMBODIMENTS

Figure 1:
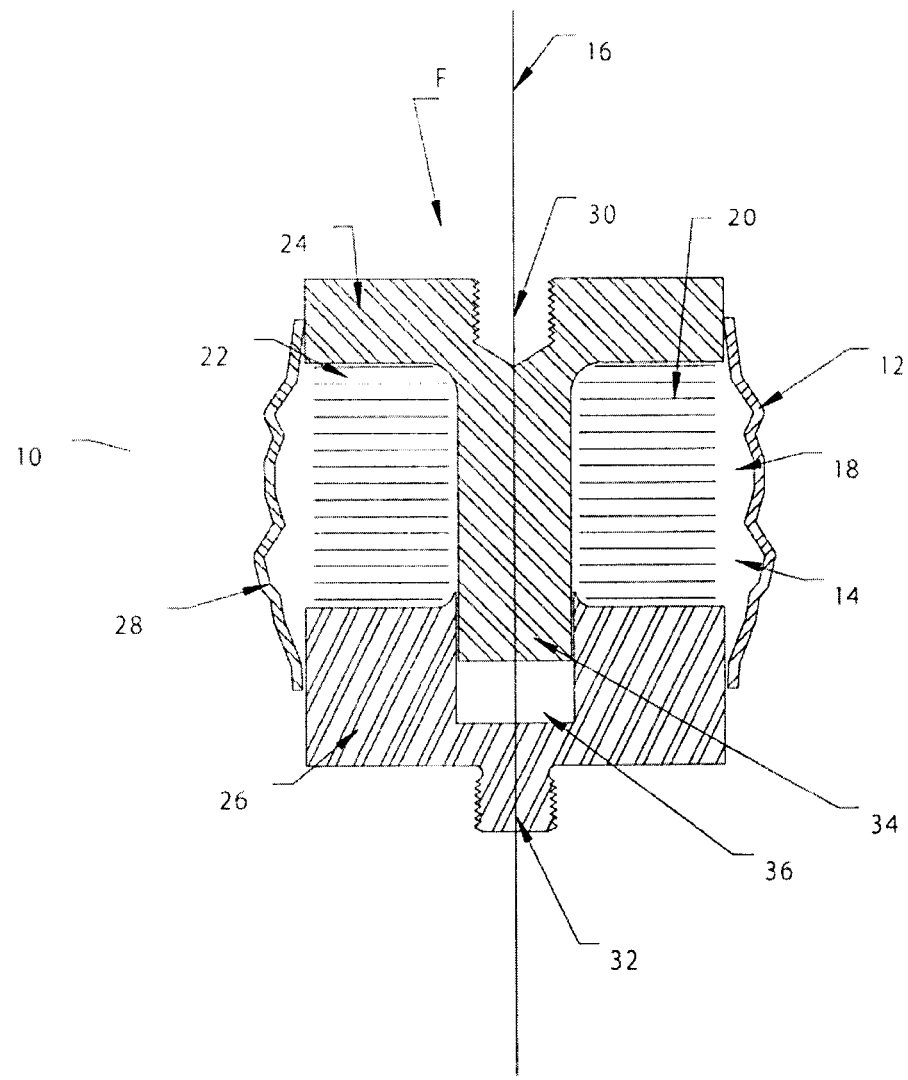
FIG. 1 is a schematic cross-section view of a single-acting variant of a hydraulic damper comprising a set of damping plates.

FIG. 1 illustrates a force limiting device which may be provided in the form of a hydraulic damper 10 comprising a housing 12 defining a hermetic chamber 14 having an axis 16. The chamber 14 contains a working fluid 18 and a stack or set of parallel plates 20 disposed generally normal to the axis 16. The plates 20 are "floatingly" received in the chamber 14 and are movable relative to each other along axis 16. At rest, each plate 20 is separated from the adjacent plates 20 by an inter-plate gap 22 occupied by the working fluid 18. The capillary action of the fluid 18 contributes to maintain the plates 20 axially spaced-apart from each other.

Figure 2:
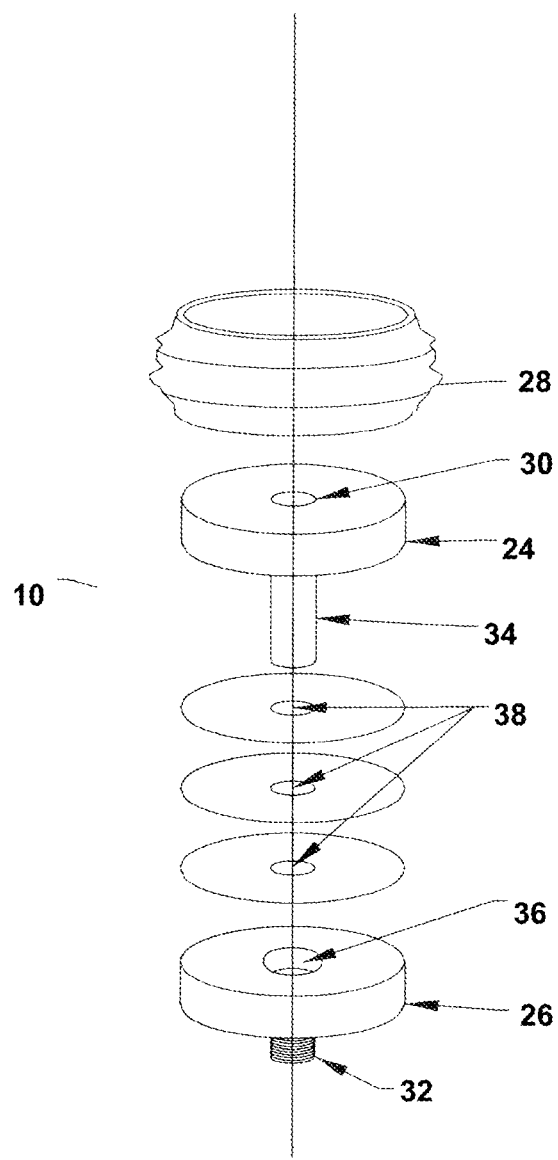
FIG. 2 is a schematic exploded view of the damper shown in FIG. 1.

As shown in FIGS. 1 and 2, the housing 12 may comprise first and second axially opposed counter-acting members 24 and 26 joined by an elastomeric boot 28. The first and second members 24 and 26 cooperate together with the elastomeric boot 28 to define the hermetic chamber 14. The elastomeric boot 28 allows the first member 24 to move towards and away from the second member 26 under the action of external forces F. Alternatively, the first member 24 could be slidably received in a tube/cylinder axially extending from the second member 26 or vice versa. The first and second members 24 and 26 are provided with respective mounting structures for allowing mounting thereof between two parts of a structure requiring damping. For instance, damper 10 could be interposed between the frame and the engine of motorized equipment, or integrated into aerospace components to dampen vibrations. In the illustrated example, the first member 24 has a central threaded hole 30, whereas the second member 26 has a central threaded stud portion 32. It is understood that any other suitable attaching/mounting structure could be provided.

As shown in FIGS. 1 and 2, the first member 24 may be provided on an inwardly facing surface thereof with an axially extending central rod or shaft 34. The distal end portion of the shaft 34 is adapted to be slidably received in a corresponding central guiding recess 36 defined in the inwardly facing surface of the second member 26. The engagement of the shaft 34 in recess 36 ensures proper axial alignment of the first and second end members 24 and 26 at all times. In other words the shaft and recess arrangement axially guides the relative movement between the first and second members 24 and 26.

As shown in FIG. 2, each plate 20 may be provided with a central hole 38 for allowing the plates 20 to be slidably/loosely mounted on the shaft 34 for relative axial movement with respect thereto. The plates 20 are prevented from axially sliding off of the shaft 34 by virtue of the engagement of the distal end portion of the shaft 34 in the central guiding recess 36; the inner face of the second member 26 acting as a stopper for the plates 20. It is understood that other suitable mechanisms could be used to prevent the plates 20 from sliding off the shaft 34. According to an alternate embodiment, the plates 20 could be loosely confined/guided in a rigid tube (not shown) instead of being fitted on a central shaft. The two counter-acting members 24 and 26 could be prevented from escaping each other axially by the following: The shaft 34 could be hollow and have a slot cut into its length. Into the hollow shaft, and co-axially to it would enter a pin protruding from the inner face of the second member 26, and be prevented from coming out of engagement from shaft 34 by a roll pin installed through the end of the pin protruding from member 26, and sliding in the slot.

Figure 3A:
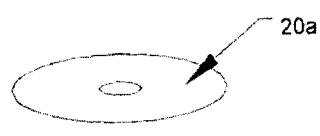
FIG. 3a is a schematic perspective view of a first type of plate that may form part of the set of damping plates of the damper shown in FIG. 1.
Figure 3B:
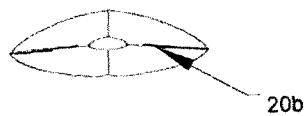
FIGS. 3b and 3c are respectively schematic oblique and side views illustrating a second type of plates that may form part of the damping plates of the damper shown in FIG. 1.
Figure 3C:
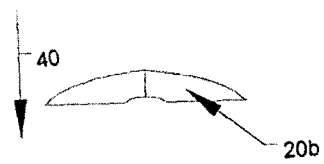

As shown in FIGS. 2, 3a, 3b and 3c, the plates 20 may have a circular shape. The outer circumference of the plates 20 generally corresponds to that of the opposed inner faces of the first and second members 24 and 26. The plates 20 may be made out of metallic material. However, it is understood that other suitable materials could be used as well. As shown in FIGS. 3a, 3b and 3c, the set of plates 20 may include plates having two different shapes and configurations. A first category of plates 20a (FIG. 3a) may be flat while a second category of plates 20b (FIGS. 3a and 3b) may be creased, wrinkled, cupped, distorted or formed in such a way as to deform the plate permanently in section across the largest plane. The deformation is induced to provide a spring effect in the axial direction 40 (FIG. 3c). The first and second categories/types of plates 20a, 20b may be alternately disposed in the set of plates shown in FIG. 1. Accordingly every other plate would belong to the second category of plates.

The springiness of the plates 20b separates the alternately stacked flat and sprung plates 20a and 20b through virtue of the inherently contained elastic deformation of the non-flat plates 20b. The resulting inter-plate gaps 22 promote the ingress of the working fluid 18 to provide a film of roughly equal thickness between each pair of adjacent plates 20 through capillary action. It is understood that the conditions required to be dampened, the viscosity of the fluid, the volume of working fluid confined between each plate 20 in relation to the escape area at rest, the input force, the input velocity, and the number of working fluid interstices, all contribute to the behavior of the dampening. However, in general, a film thickness of not more than 0.050 inches per gap, and more typically 0.010 inches per gap is adequate.

According to another embodiment, all the plates 20 could be flat, and the separation of the plates could be achieved by springs (not shown), or suitable porous media disc or elastomeric separators interspersed between the plates 20, or any device which would promote the separation of the plates 20 to accept the ingress of the working fluid to the required film thickness between the plates 20. For instance, separators could be made in the shape of starfish with a hole to guide the lot on the shaft 34. The radial slots provided by spaces between the fingers would promote the capillary refilling of the spaces 22. Cloth or some other similar porous material might also be used to promote wicking of the fluid back between the plates 20.

Allotment of space either radially outwardly of the plate circumference, or inwardly through the plates 20 by virtue of perforations (not shown) in each plate 20 or through a center hole defined therethrough, is provided to allow egress of the working fluid 18 as the plates 20 are forced together under the action of the movable first force transmitting member 24 on the working fluid 18. According to the embodiment illustrated in FIG. 1, when subject to a compression load, the working fluid 18 is squeezed out from between the plates 20 in a radially outward direction and the volume of fluid displaced is stored by radial inflation of the elastomeric boot 28. However, as mentioned above, it is understood that the working fluid 18 could as well be squeezed out from between the plates 20 in a generally axial direction through perforations defined in the plates 20.

The working fluid 18 may be provided in the form of mineral oil. However, it is understood that other hydraulic or viscous fluids could be used as well. For instance, any of the following fluids might be suitable, having considered other aspects of construction, namely plate area, number of plates, thickness of the film at rest, required dampening force and/or travel duration: Glycerine, glycol, grease, vegetable oil, emulsions of water and oil, water-alcohol. This is not intended to constitute an exhaustive list. Gases could also be used for certain applications.

It is understood that the dampening characteristics vary as a function of the viscosity of the fluid, due to the conversion of the input energy to heat through molecular friction of the fluid being forced out laterally along the face of the plates 20. Furthermore, as the input velocity increases, or the inter-plate space decreases, the rate of conversion is higher due to the higher molecular shear acting on the fluid. Intuitively, more viscous fluids would provide greater force dampening at lower velocities. Mineral oil is chosen principally for its appropriate viscous properties and is given due consideration for thermal viscosity stability, chemical stability, chemical compatibility, corrosion inhibition, extreme pressure lubrication characteristics, and others. The volume of working fluid 18 is generally, but not necessarily, free of dissolved gasses, including air. Once loaded in the housing 12, the working fluid 18 is sealed from the atmosphere and prevented from acquiring atmospheric gasses by the hermetic chamber 14 formed by the elastomeric boot 28 and the end members 24 and 26. The prevention of the re-acquisition of atmospheric gasses into the degassed fluid by the hermetic elastomeric boot 28 aids in the prevention of the formation of cavitations bubbles. This would promote the flatter dynamic response through all operating conditions by assuring that the fluid's flow characteristics from the inter-plate spaces 22 would remain constant.

In use, the damper will typically be mounted between a fixed object and an object that is movable with respect to the fixed object. For instance, the first member 24 could be connected to the movable object, while the second member 26 is connected to the fixed object. When a force or load F is applied on the first member 24, which in this case acts as working or force transmitting member, the same will be axially displaced towards the second member 26 (i.e. the reaction member) against the working fluid 18. The action of the first member 24 on the working fluid 18 will cause the plates 20 to be axially pushed against each other from top to bottom. Since each plate 20 has little mass in relation to the input force, the response to input forces is quasi-instantaneous through the stack of plates 20, where each plate will seek to maintain a hydraulic pressure balance between itself and its two neighbours. The thickness of the fluid film is expected to be reduced in thickness equally between all plates generally simultaneously.

As a result, the working fluid 18 between each pair of adjacent plates 20 will be squeezed out from between the plates 20. The volume of working fluid that is displaced as a result of the collapsing of the plates 20 will flow radially outwardly from the periphery of the plates and stored by the inflation of the boot 28.

As can be appreciated from the foregoing, when a load is applied to the cushion or unit 10 from an at rest position, the plates 20 are forced closer together. This reduction in distance causes the fluid 18 to be forced out from each inter-plate space. The reaction force resisting the collapse of each fluid film (e.g. oil film) is produced by the volume of fluid between each plate being forced to flow radially out of the relatively small escape area. The escape area is defined by the circumference of each plate multiplied by the escape thickness. The area of each plate face defines the active surface against which the hydrostatic forces will bear to resist the collapse of the cushion. The reaction force is defined by the surface area of one plate multiplied by the average hydro-dynamic pressure set up by the fluid flow escaping the plate gap. The hydraulic pressure on the fluid near the escape area is less than that on the fluid further into the plate, due to the pyramiding effect of the resistance to flow. The forces acting on each plate 20 is on a plane parallel to the thickness of each plate, and is induced by the friction of the oil sliding along the plate surface. Each plate is loaded in tension parallel to the face. Since all plates 20 are free to move independently of each other, they will seek to balance themselves against each other in a direction perpendicular to the face of each plate 20. Thus, the reaction force of any one will fairly represent the force on any other. The force input into the cushion will bear ultimately on the inner faces of the two counter-acting members 24 and 26. Only these two are constructed to withstand the sum of the mechanical forces input into the cushion. If the collapse velocity is constant, the reaction force will increase exponentially as the cushion is collapsed due to the ever decreasing escape area offered to the fluid versus the same pumping area. If the cushion is collapsed with a constant force, the velocity will slow progressively until there is contact between all plates. This velocity-dependent self-compensating characteristic makes the graph of force versus time of a decelerating load tend to have a vertical entry force, a flat-topped deceleration profile, and a tapering finish, until the input force is equal to the inherent spring force of each plate, or the point where the plates touch completely. The force multiplied by the distance traveled will dictate the amount of energy converted to heat through molecular friction of the fluid.

The ratio of the effective area of the working face of each plate 18 versus the fluid escape area as measured along the circumference of the plates 20 multiplied by the thickness of the oil film between the plates 20 provides a non-linear increasing reflected force damping behaviour of the hydraulic damper as the film thickness collapses.

The dampening characteristics are self-compensating by virtue of the relation between the plate effective surface area and the escape area ratio. If the entry velocity is high from an at rest position, the stroke distance available is large and provides time to decelerate the load. If the entry velocity is low, the damper 10 acts soft due to the decreasing force per unit area acting to force the working fluid 18 out of the inter-plate gaps 22. As the stack of plates 18 collapsed and the load velocity slows down, the thickness of each oil film is less, and therefore the ratio of the pumping area (i.e. the effective surface area of the plates) versus the escape area of the confined oil is correspondingly higher. This higher reflected force at differing the reduced thicknesses causes the damper 10 to have a nearly flat reflected load curve in decelerating kinetic masses.

The kinetic energy input into the damper 10 is converted to heat by virtue of the molecular friction of the inordinately large effective surface area provided by the sum of the effective surface area of all the plates 20, when forced to bear in friction with the relatively thin film of working fluid 18 moving laterally across the compression faces of the plates 20. Indeed, the sum of the effective surface area of all the plates 20 provides for a total effective surface area which is significantly larger than the effective surface area of a conventional hydraulic damper having a cylinder with a sliding piston inside. In other words, the set of plates 20 have a cumulative damping effect.

The relatively large effective surface area of the plates 20 provides a relatively high reaction force, which is generated perpendicularly to the compression or working face of the plates, while keeping the force per unit area acting on any of the internal working parts to a relatively low value. Large forces can be attenuated in small package due to the nature of the operation of the unit, in that neither seals nor pressure vessels are required to contain the hydrostatic forces found in conventional piston and cylinder dampers. Instead, the forces are contained between balanced working surfaces provided by the plates 20 and the end members 24 and 26.

Contrary to conventional cylinder and piston type dampers which require a seal between the piston and the cylinder, the damper 10 does not require any high pressure seal and is substantially friction free, which makes it reliable. The absence of static seal friction makes the damper 10 more sensitive/responsive to small variations in input loads. The damper 10 is also advantageous in that the reflected load characteristic as seen through the damper converts much of the input energy to heat, and spreads the remaining force over time. This phase shift greatly reduces the effects of transient force peaks, thus protecting down-line equipment from high intensity short duration overloads.

Figure 4:
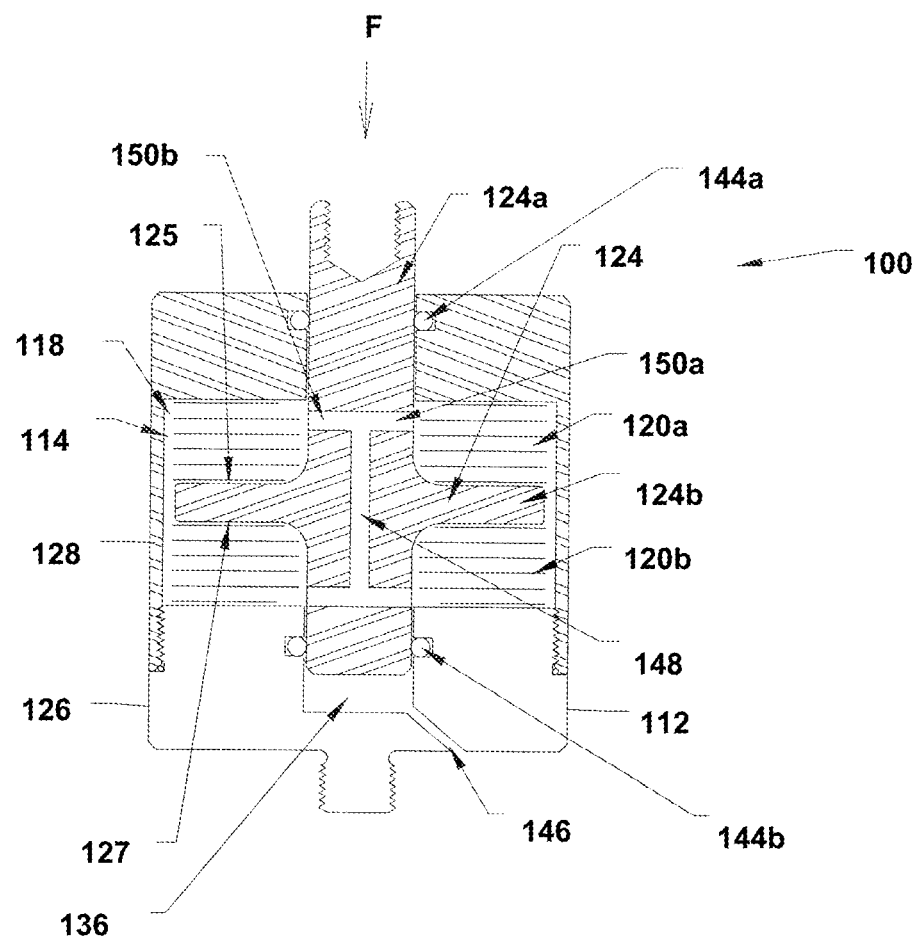
FIG. 4 is a schematic cross-section view of a double-acting variant of a hydraulic damper in accordance with another embodiment of the present invention.

FIG. 4 illustrates how two sets of damping plates 120a and 120b can be mounted back to back in one unit 100 to provide a double-acting damper. According to this embodiment, the housing 112 may be composed of a cylinder 128 having an open end sealingly closed by a cap 126 to form a chamber 114 filled with the working fluid 118. As shown in FIG. 4, the cap 126 may be threadably mounted or otherwise suitably secured to the open end of the cylinder 128. A spool 124 including a shaft 124a and a central piston head in the form of an annular flange 124b is mounted for reciprocal movement inside the cylinder 128. The annular flange 124b provides two opposed working surfaces 125 and 127 so that bi-directional loads input into the unit would be born against the housing 112 through the two sets of damping plates 120a, 120b. The circumference of the annular flange 124b may be less than the inside diameter of the cylinder 128 to allow the working fluid 118 to pass from one side of the flange 124b to the opposed side thereof. Alternatively, this may be accomplished by providing holes through the flange 124b. A first end of the shaft 124a extends outside of the housing 112 through a central hole defined in the closed end wall of the cylinder 128. The first end of the shaft 124a is adapted to be connected to a surrounding structure requiring damping. A first seal 144a may be mounted in the central hole to prevent the working fluid 118 from leaking out of the chamber 114. The second end of the shaft 124a of the spool 124 is slidably received in a corresponding central recess 136 defined in the inwardly facing surface of the cap 126. A second seal 144b may be provided in the recess 136 to prevent the working fluid 118 from flowing around the shaft 124a into the recess 136. A vent 146 is defined in the cap 126 for allowing the air trapped in the recess 136 behind the second end of the shaft 124a to communicate to atmospheric pressure. To keep the seal pressure at relatively low values, a cross-bleed flow passage 148 may be defined centrally axially through the shaft 124a with a series of radial holes 150a, 150b at or near the seal points. In this way, some of the working fluid 118 at a working-end seal can bleed back through the shaft 124a to the non-working end. Since the inlet of the cross-bleed passage 148 is at or near the seals 144a, 144b, the hydrostatic pressure required to force the working fluid 118 radially out from between the damping plates 120a, 120b is not compromised, and each plate stack behaves normally.

The first set of damping plates 120a is loosely mounted on the shaft 124a between the closed end wall of the cylinder and the annular flange 124b of the spool 124. The second set of plates 120b is loosely mounted on the shaft 124b between annular flange 124b and the cap 126. The plates of both sets are free to axially move relative to the shaft 124a. Each plate 120a, 120b is spaced from an adjacent plate by a film of working fluid 118. When the plates of a given set are forced together, the working fluid between the plates will be squeezed out radially outwardly from between the plates and allowed to flow to the other set of plates on the other side of the flange 124b. For instance, if an axial force F' is applied on the spool 124, the working face 127 will move the working fluid located between the flange 124 and the cap 126, thereby forcing the stack of plates 120b to collapse. The working fluid 118 squeezed out from the stack of plates 120b will flow past the outer circumference of the flange 124b to the stack of plates 120a located on the other side of the flange 124b. The working fluid flowing to the set of plates 120a will cause the plates 120a to be spread further apart. The pressure differential between the compression of plate stack 120b and the expansion of plate stack 120a will cause the fluid to flow into the voids between plates 120a. Capillary action which permits the fluid to flow into the voids will be aided by the inherent spring force in whichever plate 20b is deformed. In time, the capillary action and the inherent spring force will cause the oil thickness between each plate to be equal in thickness throughout plate stack 120a.

The need for an elastomeric expansion chamber in this second embodiment is obviated by the equal displacement of either end of the spool 124. Since the internal volume of the unit remains the same regardless of the position of the spool owing to the double-rod arrangement, the fluid displaced from plate stack 120b is hydrostatically compelled to fill the void in plate stack 120a.

Figure 5:
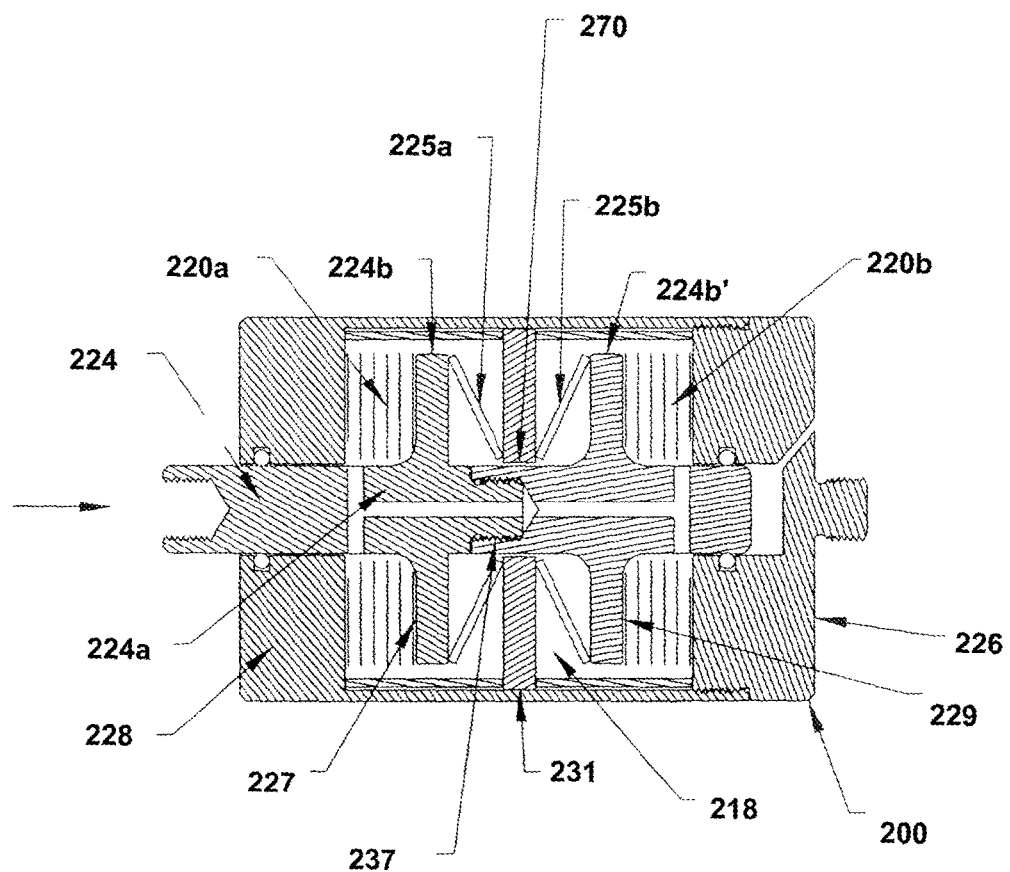
FIG. 5 is a schematic cross-section view of an internally pre-loaded double-acting variant of a hydraulic damper in accordance with a further embodiment of the present invention.

The variant of internally or externally mounted springs to accomplish a pre-load condition can be achieved in a variety of ways. FIG. 5 illustrates one possible configuration of an internally pre-loaded double acting unit 200. In the embodiment of FIG. 5, a set of internal springs 225a and 225b tuned to the lower threshold load are mounted to bear against a double flanged spool 224 and a central partitioning disc 231. The spool 224 has first and second flanges 224b and 224b'. The partitioning disc 231 is mounted between the first and second flanges 224b and 224b'. The first spring 225a extends between the first flange 224b and the partitioning disc 231 to bias the spool 224 toward the left-hand side in FIG. 5, while the second spring 225b extends between the partitioning disc 231 and the second flange 224b' to bias the spool 224 towards the right-hand side in FIG. 5. The first flange 224b has a working surface 227 facing the end wall of the cylinder 228. Likewise, the second flange 224b' has a working surface 229 facing the cap 226 closing the open end of the cylinder 228. A first set of damping plates 220a is loosely mounted on the spool shaft 224a between the working surface 227 and the end wall of the cylinder 228. A second set of damping plates 220b is loosely mounted on the spool shaft 224a between the working surface 229 and the cap 226. The spaces between adjacent plates (i.e. the inter-plate gaps) are filled by the working liquid 218 just like in the other embodiments. The partitioning disc 231 is held in the middle of the chamber 214 between tubular spacers 264. The cap 226 axially retains the spacers 264 and, thus, the partitioning disc 231 in position in the chamber 214. With the springs 225a and 225b in slight pre-tension, any external load acting axially on the spool shaft 224a would have to overcome the tension of the springs 225a and 225b before causing the space confining the set of plates 220a, 220b to change. For instance, to move the spool 224 to the right in FIG. 5, the biasing force of the first spring 225a has first to be overcome. Then and only then, the spool 224 can be moved to the right to cause the second stack of plates 220b to be pressed against the cap 226, thereby causing the working fluid to be squeezed out from between the plates 220b. The working fluid displaced by the motion of the working face 227 of the second flange 224b' is allowed to flow to the idle plate pack 220a through axially extending passages 270 defined in the partition disc 231.

The spool 224 is assembled generally, but not necessarily, by a central screwed shaft connection 237 between the flanges 224b and 224b', thereby allowing the assembly of the partition disc 231, the two springs 225a and 225b, and the spool halves inside housing 228. The opposite faces are engaged when the spool 224 is moved to the left. Springs of different strengths can be employed to have different breakaway forces in extension or compression of the unit. Since the springs 225a and 225b hold the spool 224 centered in the housing and motion is prevented until the spring force is overcome by an input force, the unit can be used to act as a breakaway overload when the unit is used in line in a position-dependant mounting. This variant could be built as a single or double acting.

Figure 6:
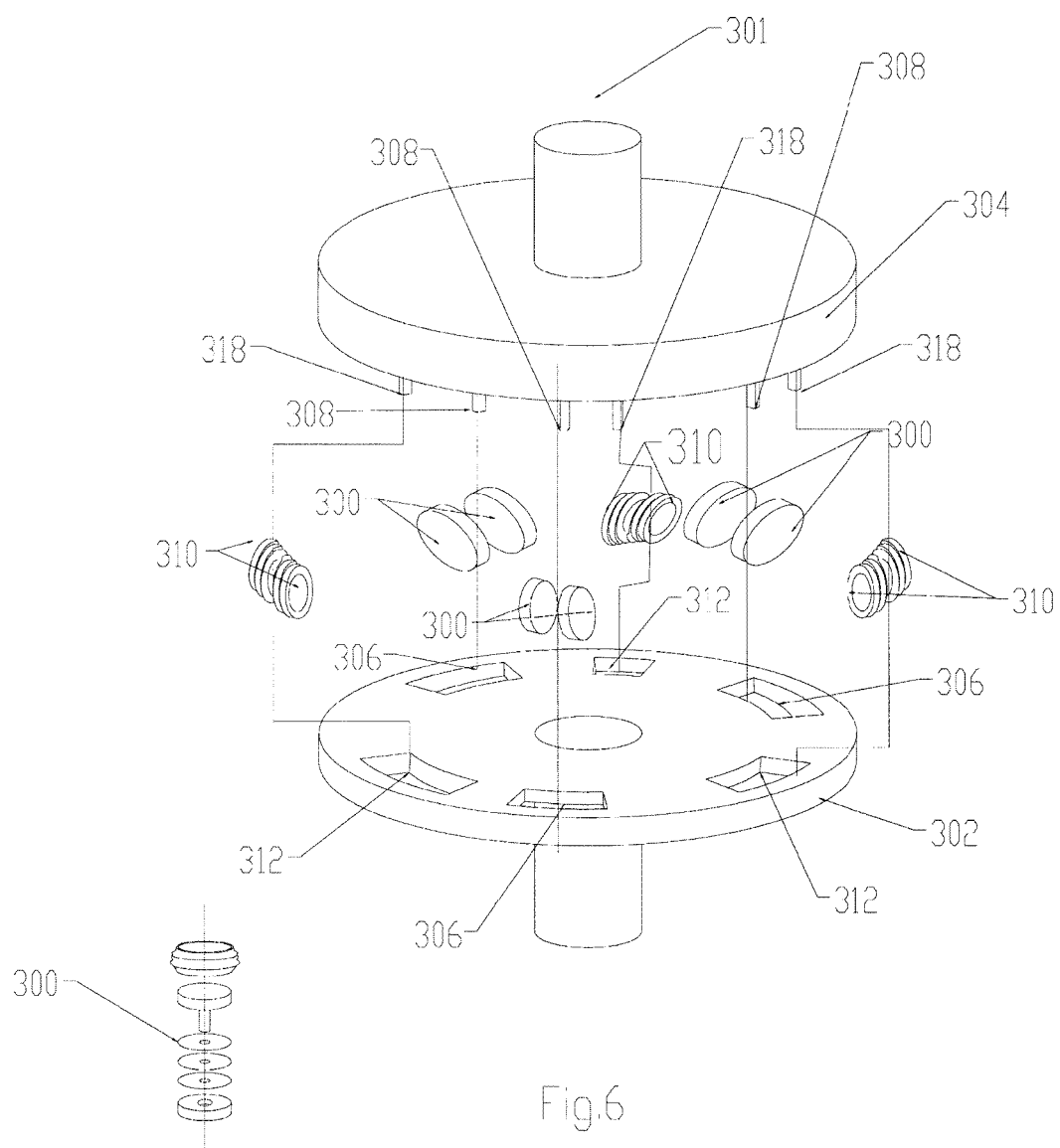
FIG. 6 is a schematic exploded perspective view of a torsional damper mounting arrangement in accordance with a still further embodiment of the present invention.
Figure 7:
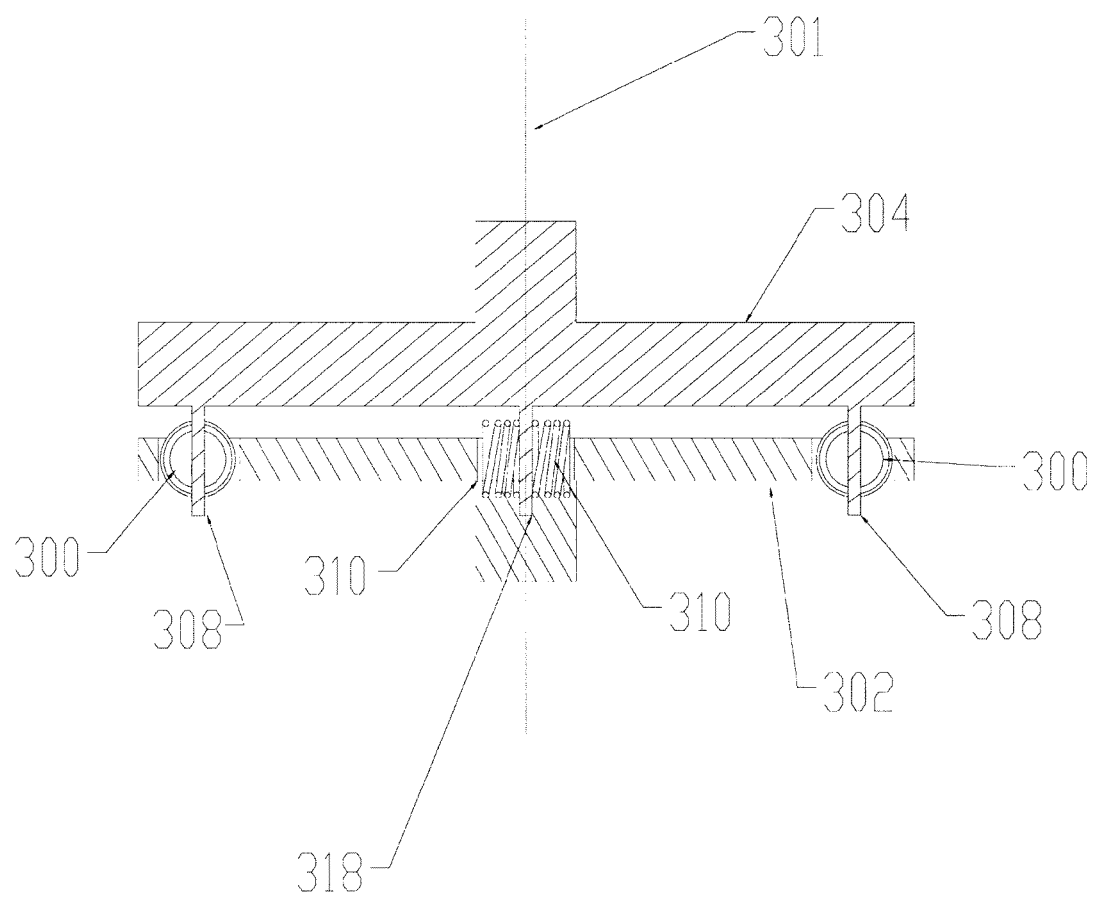
FIG. 7 is a schematic cross-section view of the torsional damper mounting arrangement shown in FIG. 6.

As shown in FIGS. 6 and 7, hydraulic damping units 300, which may each be similar to unit 10 shown in FIGS. 1 and 2, may also be used to provide torsional damping. The torsional damping assembly shown in FIGS. 6 and 7 may, for instance, comprise a pair of discs 302 and 304 drivingly connected for joint rotation about an axis 301. The first disc 302 has a series of circumferentially spaced-apart slots 306 defined therein. Each slot 306 extends along an arc of circle. The second disc 304 has a first series of circumferentially spaced-apart fingers 308 extending perpendicularly from one face thereof for engagement in the slots 306 of the first disc 302. A pair of individual damping units 300 is mounted at opposed ends of each slot 306 with one finger 308 engaged therebetween. A second series of circumferentially spaced-apart slots 312 is defined in the disc 302. The second set of slots 312 is angularly offset relative to the first set of slots 306. As shown in FIG. 6, each slot 312 is disposed between two slots 306. In addition to the damping units 300, a pair of coil springs 310 or the like may be mounted in each slot 312. A second set of circumferentially spaced-apart fingers 312 projects from disc 304 for engagement between each pair of springs 310. The springs 310 provide a lower threshold breakaway force. The springs 310 will provide the torque characteristic for normal drive force, and variations in driving torque between the discs 302 and 304 which exceeds the spring force would be dissipated into the damping units 300.

Figure 8:
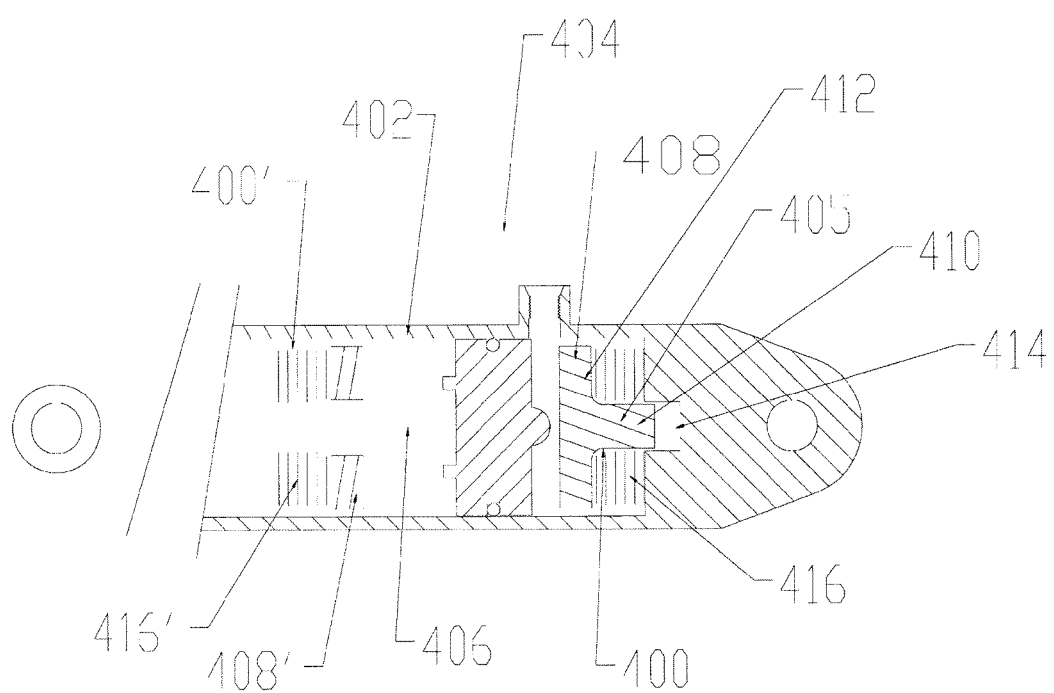
FIG. 8 is a schematic cross-section view illustrating a hydraulic cylinder end stop embodiment of the present invention.

As shown in FIG. 8, the damping units 10, 100 or 200 could also be used as hydraulic cylinder end-stop cushions. For instance, a damping unit 400 can be mounted inside the cylinder 402 of a hydraulic cylinder and piston arrangement 404 to cushion the linear motion of a ram 406. The damping unit 400 may comprise a plunger-like member 405 having a head portion 408 and a shaft portion 410 extending perpendicularly from a working face 412 of the head portion 408. The distal end of the shaft portion 410 is axially guided in a bore or recess 414 defined in the end wall of the cylinder 402. A set of damping plates 416 is freely mounted on the shaft portion 410 of the plunger-like member 405. The axial gaps between the plates 416 are filled by the hydraulic fluid used to actuate the cylinder 402. The diameter of the head portion 408 of the plunger-like member 405 and that of the plates 416 are generally smaller than the inner diameter of the cylinder 402. When the ram 406 reaches the end of its stroke, it axially pushes against the head portion 408 of the plunger-like member 405, thereby axially displacing the head portion 408 to bear force onto the plate stack. The action of the working face 412 of the head portion 408 of the plunger-like member 405 causes the pack of plates 416 to collapse, thereby squeezing out the oil from between the plates, as described herein before. Cushioning could also be provided at the end of the return stroke by mounting a second unit 400' onto the rod-end of the ram, as shown in FIG. 8. The second unit 400' may comprise an annular flange 408' fixedly mounted on the rod-end of the ram 406 and a stack of plates 416' freely mounted on the rod-end of the ram 406 between the annular flange 408' and the end wall of the cylinder 402.

The above arrangement provides an interesting alternative to the current practice which typically consists of providing a tapered plug onto the end of the ram for engagement in a hole of close fitting tolerances in the end cap of the cylinder to provide hydraulic pumping through a braking orifice. To move the ram out of the cushion of this form requires a machined port with a flow check valve allowing oil back into the space behind the tapered plug, as the plug recedes. The advantages of the above proposed alternative comprise: simplicity, reduced machining, elimination of the required breakaway retraction force typical to lifting the flow check off of its seat, reduced mechanical size requirements, and improved damping at varying loads and velocities due to the self-compensating nature of the illustrated embodiment.

Figure 9:
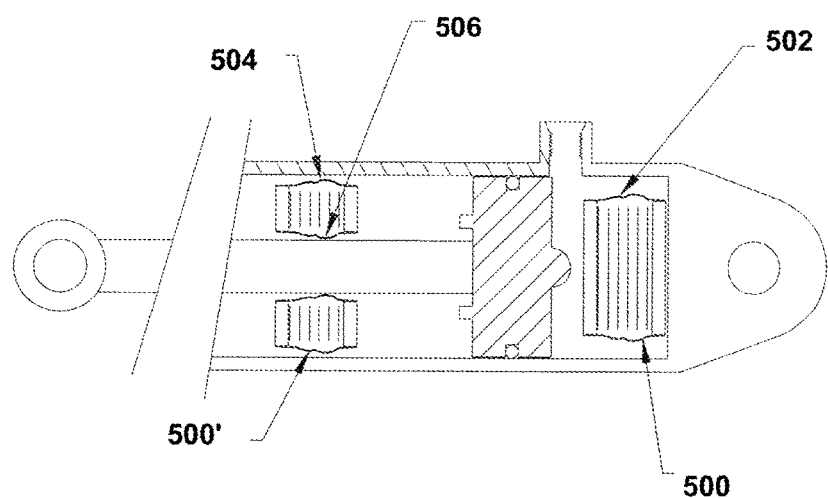
FIG. 9 is a schematic air cylinder end stop embodiment of the present invention.

As shown in FIG. 9, the cylinder end-stop variant could be adapted to air cylinders as well. In adapting the cushion or damping unit 500 to air cylinders, an elastomeric envelope 502 would be provided to contain the working fluid. For instance, a unit similar to the unit shown in FIG. 1 could be used. The rod-end unit or return stroke unit 500' would comprise an elastomeric seal to both the outside periphery 504 and the inside periphery 506 of the hole in the stack of plates.

Figure 10:
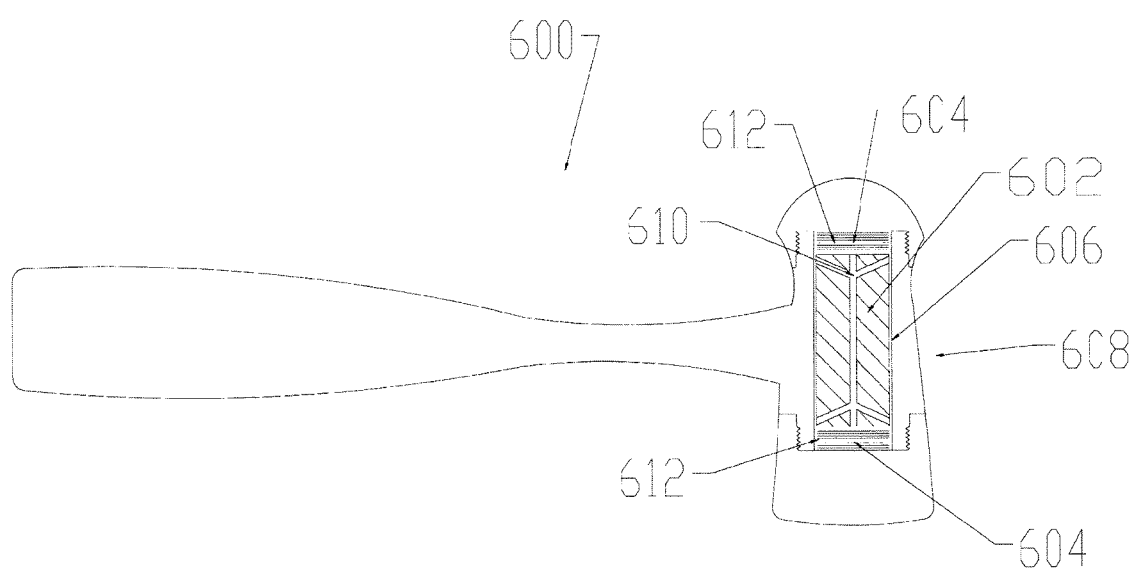
FIG. 10 is a dead blow hammer head embodiment of the present invention.

FIG. 10 illustrates one possible dead-blow hammer application. The hammer 600 has a hammer head 608 comprising a mass 602 mounted between two hydraulic damping units 604 inside a cylindrical tube 606 and retained captive therein by any appropriate means, such caps threadably mounted to oppose ends of the tube 606. An internal passage 610 allows the exchange of the displaced working fluid upon the collapsing of the plate packs 612 of the units 604 to the opposite end of the acting/solicited damping unit. The damping units 604 could, for instance, take the form of any one of the embodiments shown in FIGS. 1 to 5. It is also understood that the specific assembly configuration shown in FIG. 10 is for illustrative purposes only and that there are many other suitable ways to incorporate a hydraulic cushion or unit into a hammer head.

Figure 11:
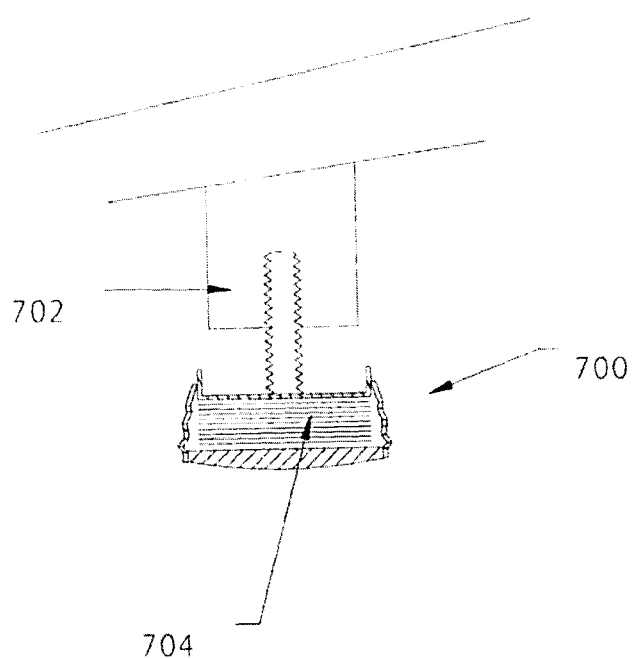
FIG. 11 is a table and chair anti-wobble embodiment of the present invention.

As exemplified in FIG. 11, the mounting of a hydraulic cushion or unit 700 to the bottom end of each leg 702 of furniture, and mostly to those of chairs and tables would provide instantaneous intervention-free self-adjustment of the object to minor localized varying floor levels, as are commonly found on tiled flooring surfaces. Each unit 700 could, for instance, be of the type shown in FIGS. 1 to 3. The inherent spring force produced by the distorted plates 704 of the type shown in FIGS. 3b and 3c would produce a reaction force which would be tuned to a value less than the normal unloaded object weight, and upon being placed or moved to a floor location which was uneven, would cause the least loaded leg cushion 700 to extend by virtue of the reduced load, or the most loaded leg cushion 700 to compress by virtue of the higher load. If an occupant shifted the load, say on the corner of a table, the two legs, generally diagonally opposite from each other with the higher load, would already have collapsed to their shortest distance, the third point, now under the elbow of the occupant, would collapse slowly, and avoid upsetting the table suddenly, and the fourth, now unloaded leg cushion would extend to take up the distance made available by the retreating leg. If the object load was to change again, or if the object was changed to a different position on the floor, a new balance would be established without rapid motion in the object being permitted.

According to another possible application, one or more force limiting devices, such as the one shown in FIG. 1, could be used as a self-adjusting vibration dampening machine base. For instance, force limiting devices 10 could be added to the bottom extremities of domestic appliances prone to vibrate, like the domestic clothes washing machine. Each force limiting devices could be force-tuned by the use of springs, or by the inherent spring force of the sprung plates, to the gravitational load normally exerted by the machine at rest. The spring rate would hold the cushion at rest in a partially collapsed state. The use of the devices would allow the machine to settle like the restaurant table, where the two opposite legs more highly loaded would collapse to their shortest distance, except that due to the force tuned internal or external springs, the devices or cushions would not bottom out at rest, but instead be held by the action of the spring at a collapse distance allowing further collapse if the force system was increased dynamically by the function of the machine.

A good example of use would be the spin cycle of the clothes washing machine. At rest, the cushions would settle to provide quasi-even force on each leg, regardless of minor localized level discrepancies of the floor, by virtue of the spring action. Once the machine began to oscillate from operating, the shear friction of the oil being forced out of the plate interstices would dissipate the energy of the machine oscillations. Furthermore, the self-compensating characteristics of the dampening effect will auto-tune the force limiting device to the frequency of oscillation seen by the machine, and tend to limit the sympathetic resonance of the machine as it accelerates through the critical speed. Another aspect of the benefit of incorporating the device into the base of machines would be the attenuation and/or suppression of noise which would normally be transmitted to the floor; the floor acting as a radiating surface which converts the vibrations induced upon it by the machine, to sound waves in the space. Since the force limiting device auto-tunes to a wide range of frequencies, a substantial reduction in sound transmission can be achieved.

Figure 12:
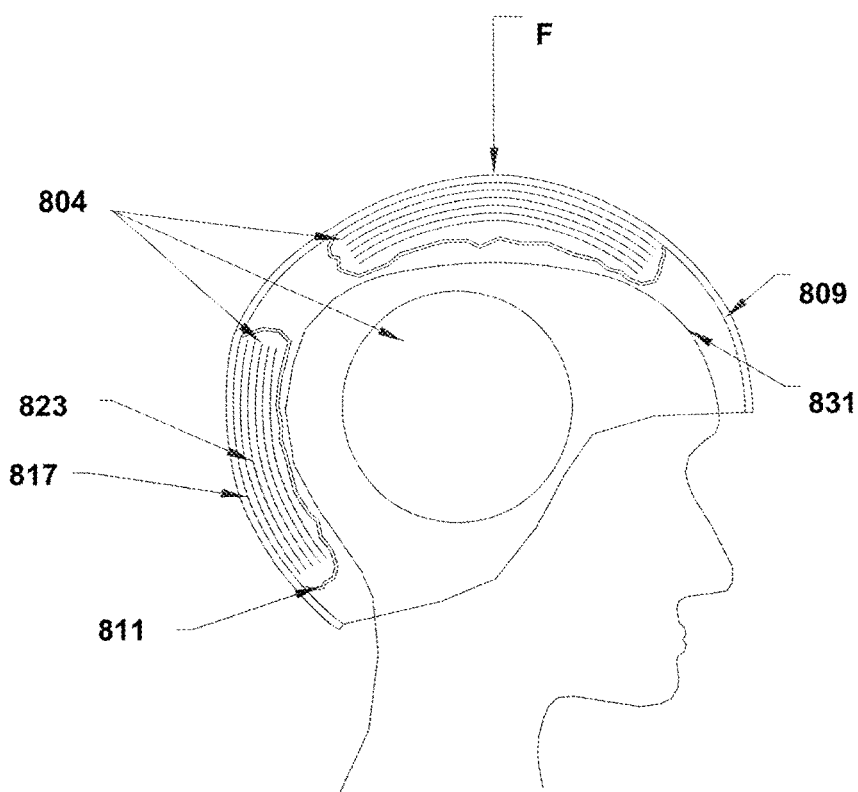
FIG. 12 shows a protective device having a plurality of shock absorbing members each including a stack of free floating piston plates individually acting on a film of fluid filling each gap between adjacent plates.

As shown in FIG. 12, the force limiting devices could also be configured to act as shock absorbing cushions in protective helmets, such as those used in practicing sports. Indeed, it may be possible to reduce physical harm to sport players by incorporating several cushions 804 into a helmet, as shown in FIG. 12. The incorporation of cushions 804 between the hard inner working surface 809 of the helmet and of the cranium 831 of the person wearing the helmet provides concussive protection to the head of the wearer. Each cushion 804 may comprise a hermetically sealed fluid filled bladder 811 mounted to surface 809 and containing a multitude of free floating plates 817, which may be made of flexible plastic material, interspersed with cloth sheets 823 of equal size. At rest, capillary action promotes the equal distribution of fluid throughout the thickness of the cushion by wicking into the cloth, and the cushion thickens to a point of hydraulic equilibrium between the cranium and the helmet. This characteristic of behavior would constitute a self-adjusting helmet, so that localized individual cranial variations of the wearer would be supported equally by the combination of the inner working surface of the helmet and the quasi-liquid state of the non-compressed cushion. When a concussive force F is applied by hitting anything with the helmet, the fluid which was contained between each plate would seek to escape laterally to the edge of the cushion. Since the cushion is self compensating by virtue of the increasing resistance as the cushion collapses versus the diminishing force applied typical to deceleration, the perceived peak force remains relatively constant but is extended over time, and is thus limited in intensity. This dynamic deceleration will help to reduce concussive forces applied to sports players, and thus limit immediate and long term trauma to the head.

As can be appreciated from the foregoing, the present invention is particularly suitable for attenuating any unidirectional or reversing load of great intensity and short duration. For instance, it could be used as entry cushions for load cells, where the collision of masses through load sensing instrumentation sets up large transient spikes, dangerous to the maximum operating limit of the load cells. It could also be advantageously used in linear acting machine requiring a rapid deceleration. Railway end-of-line bumpers made of this configuration would be useful in protecting the end-of-line bolster. It could also be used on machine bases or component mounts where the use of springs or elastomeric mounts to support the mass gives rise to deleterious base harmonic frequencies. By having a portion of the energy converted to heat, the settling time of the harmonic would be shortened. The use of frequency-tuned dampers in aerospace would aid in attenuating dangerous or problematic harmonics or peak-force transients.

As will be seen hereinafter, the compensating device could also be adapted for use as: a gun recoil pad (FIG. 13), a machine vibration isolation base (FIG. 14), an energy dissipating mounting link (FIG. 15), and an electronic component shock dissipating mount (FIG. 16).

With respect of the gun recoil pad application, it is noted that there are already recoil pads made of porous elastomeric materials which are mounted on the butt-stock of guns which serve to compress somewhat and reduce the rate of energy transmission of the recoil event to the shooter's body. However, there remains much room for improvement.

As shown in FIG. 13, the incorporation of a compensating damper of the type described herein above into a butt stock recoil pad 1003 provides a marked and substantial reduction in the physiological harm of shooting shoulder mounted guns, serves to improve accuracy by helping overcome the psychological flinch, allows more rapid and accurate firing by reducing the time required to overcome the physiological reaction to each event, and by sequestering a substantial amount of the recoil energy as molecular friction in the compensating damper, reducing the time and distance of the rock-back required to reposition the gun accurately for the next shot.

The dynamics of shoulder fired guns produce a force quasi-collinear with the axis of the gun barrel, and reacting opposite to the direction of the projectile and ejecta. The energy of the projectile and ejecta being accelerated forward act against the mass of the gun, (and in some cases, minus the work done by mechanisms used to actuate the gun's cocking mechanism,) produces in the mass of the gun, a velocity backwards towards the shooter. This event is known as recoil. The shooter is required to absorb the energy of recoil through the viscous friction of the tissues of the body, and the input of muscular effort to counter the force. The mechanical connection of the reaction force from the gun to the shooter's shoulder is the physical area of gun butt stock in contact with the shooter's shoulder at the time of initiation of the event. Since the time required to produce muscular counter resistance is relatively slow in human terms when compared to the speed of the recoil event, the initial recoil event behaves in classic Newtonian fashion; a mass moving at a certain velocity impacts another mass, and imparts its energy to the receiving mass; the elasticity of the connection and the fluidity of the receiving mass dictate the rate of acceleration of the receiving mass. Whereas the time the expulsion of the projectile and ejecta takes, say, 3 milliseconds, the human muscle reaction time is in the order of 200 milliseconds or more. Clearly, the entire energy input event is over before the shooter can react, and the initial resolution of the recoil force is seen as a shock wave propagating through the flesh of the shooter. This shock wave as it travels through the flesh causes molecular friction and results in a substantial portion of the energy being converted to heat.

In order to anticipate the blow of the recoil while pulling the trigger, some shooters involuntarily flinch to protect themselves. This affects shooting accuracy by adding erratic muscle contractions or by loading opposing sets of muscles in tension and causing muscle strain induced movements. Another negative aspect of shooting guns is the physiological harm done to the shooter when using large bore, high power rounds. The high recoil forces cause tearing of the human tissue, bruising, soreness and future apprehension in shooting.

It is classically trained to hold the gun tightly to the shoulder in anticipation to the recoil. While this strategy reduces the felt recoil by increasing the muscle-induced mass-coupling to the system, the force per unit area between the gun butt stock and shooter's shoulder will ultimately be higher. This muscle strain also contributes to shaking or twitching as the trigger is pulled, leading to a loss of shooting accuracy.

Another objectionable aspect of the coupling of the butt stock's energy to the shooter's shoulder is the relatively high shear force acting on the tissue at the corner of traditional gun butt stocks. Since the tissue at these velocities and forces behaves as a viscous fluid, the acting area of the butt stock causes all of the tissue behind the butt stock to flow, and localized rending of the flesh as the shock wave wraps around the corner of the now-advancing butt stock into the tissue. This localized rending breaks blood vessels, stretches tendons and muscle, tears nerves, and causes bruising. As the shock wave propagates radially, more and more tissue mass is added to the equation, including bone and connective tissue. As more tissue reaches its maximum normal extension, the active tissue mass involved in decelerating the gun increases, and reaches a point of velocity equilibrium where the gun and shooter begin to move as one. This state of velocity equilibrium generally causes the shooter to rock back, and is now within the reaction time of the human animal to counter the momentum and return the gun to the original position. Apart from the muscle effort required to right the body and gun back to the original position, the recoil energy was absorbed into the tissue through molecular friction.

Figure 13A:
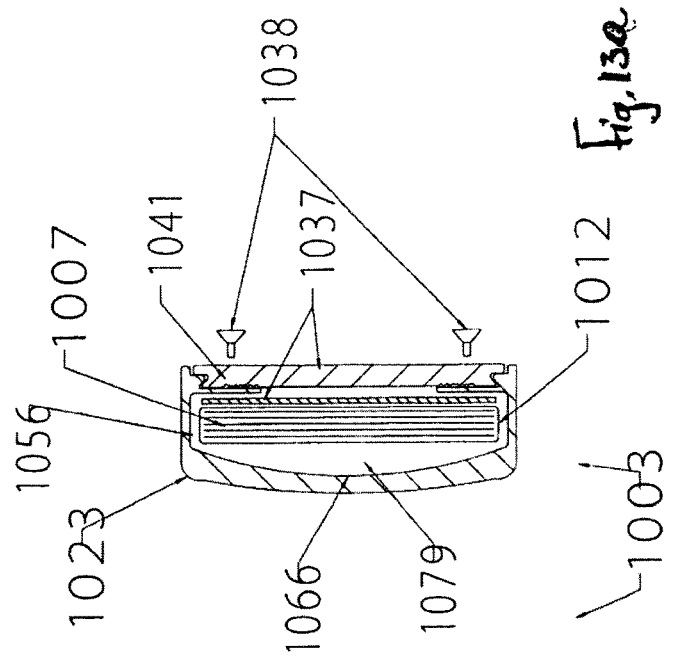
FIGS. 13a and 13b show an embodiment of a compensating damper incorporated into the recoil pad of shoulder fired guns.
Figure 13B:
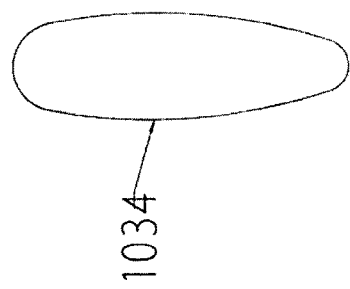
Figure 18B:
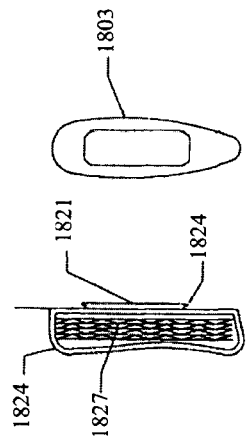
FIGS. 18a to 18d illustrate a mounting system for mounting a recoil pad having a compensating damper such as the one shown in FIG. 13 to a shoulder fired firearm.
Figure 18A:
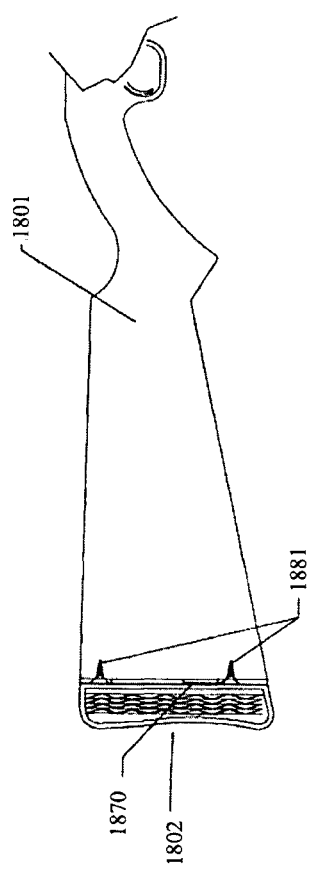
Figure 18D:
Figure 18C:
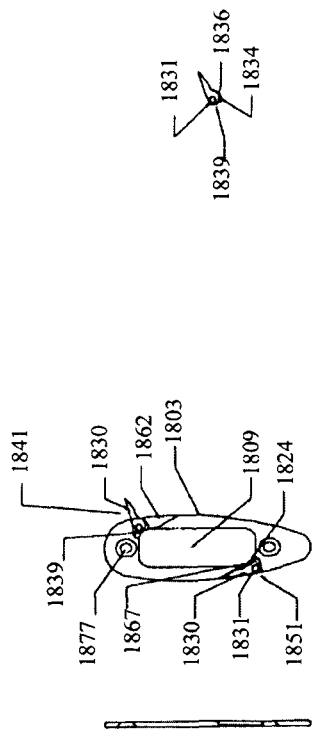

FIGS. 13a and 13b illustrate another embodiment of compensating damper suited for use as a new gun recoil pad 1003. However, it is understood that the features of this embodiment could be used in other applications or combined with features of other herein described embodiments. The gun recoil pad 1003 comprises a series of alternately stacked wavy and flat plates 1007 held inside a chafe resistant open weave mesh bag 1012, and inserted into a hermetically sealed elastomeric boot 1023 approximating the cross-section of the butt stock of a gun 1034. The boot is closed at the end normally against the butt stock of the gun by two plates 1037 clamping the elastomeric boot by means of screws 1038, and having teeth or grooves 1041 in the faces of the plates making certain the mechanical connection. The boot 1023 is filled with a viscous fluid 1056 preferably but not necessarily glycerine, and pressurized to cause the boot wall to be distended somewhat 1066. This internal pressure acting to cause tension in the boot allows the pad to be more rigid, while permitting thin wall sections of the boot 1023 which are needed to stretch during the recoil event. The entire bladder now being rounded outwards by the internal pressure of the fluid causes the end which the shooter puts against his shoulder to be lifted away internally from the plate stack 1079, and have a fluid thickness there of about ⅛" or more. The mesh bag 1012 holds the spring action of the plates 1007 to a set maximum extension distance with, typically 0.015" to 0.030" distance per gap. In other words, the mesh bag 1012 holds the plates to a stack height of about ¾", and the internal bladder distance has about ⅞" of internal space when distended by the fluid pressure. This free fluid, while being seemingly inconsequential to the operation of the damper plates proper, contribute to the recoil pad damper's operation, and provides hydraulic cushioning to the shooter's tissue principally as the recoil event begins.

For all the contemplated embodiments, there can be more than one film thickness across the stack of plates. Each of the varying film thickness zones provides a different resistance response when acted upon by an outside force. Generally, when there are two different film thickness zones, the first one to collapse is the thicker one, owing the relatively low lateral flow resistance offered by the wide gap. Conversely, if the structure of the unit holds two or more sets of plates or gaps of fluid, the one with the smaller gaps would only begin to collapse once the larger zone of gaps had reached nearly the same thickness as the thinner gap zone or hydrodynamic equilibrium to the thinner film zone is reached, whichever occurs first.

For gun recoil applications shown in FIGS. 13a and 13b, each zone of fluid film thickness contributes benefits to a different operational phase of the recoil pad's deployment; the thicker fluid film nearest to the shooter acts first to provide balanced force between the shooter and the plate stack proper. Progressively as the thicker film flows out and becomes equal to the inter-plate pressure, the inter-plate gaps begin to provide high fluid shear energy conversion as the inter-plate gaps force their fluid out laterally across the plate faces into the expanding boot.

The density of the fluid and the elasticity of the elastomeric boot are chosen for their approximation to the density and elasticity of flesh. In that way, when the shock wave of the butt-stock begins its excursion into the shoulder of the shooter, the force transition interface between the recoil pad and the shooter's tissue is transparent. In other words, the bladder will mold itself to the resistance offered by the flesh and adjust itself by redistributing fluid from zones of high force-per-unit areas to zones of low force-per unit areas. This fluid distribution keeps the force averaged at any point to be the lowest possible. Also, the high shear force exerted at the corner of traditional butt stocks as they incur into the tissue are virtually eliminated. The shock wave of the advancing recoil pad, owing to the flattening out of the bladder will for a short duration expand to be larger than the original boot contact area by a considerable amount. An increase of 2 times the at-rest area is not uncommon, depending on the parameters of the dampening plates as they behave at the given recoil force level, the mass and muscle pre-tensioning of the shooter, the recoil velocity of the gun, the mass of the gun, the elastic stiffness of the recoil bladder, the viscosity of the fluid chosen, and other factors.

Furthermore, as the boot 1023 flattens out from the force, the shock wave rolls the contact patch ever wider, and redirects the shock wave to blend into the tissue perpendicular to the recoil direction, and travel parallel the surface of the shooter's skin. This gradual lateral re-direction of the shock wave as the boot rolls sideways, lowers the peak force in the tissues adjacent to where a traditional butt stock would cause the greatest amount of shear.

As the recoil pad 1003 collapses and the fluid pressure becomes balanced between the shooter and the first plate in the plate stack, the plates 1007 being relatively thin, will flex to follow the contour offered by the resistance of the shooter's particular anatomical features such as bone and tendons, and will further redistribute any point loading on the tissue.

Since the fluid in the inter-plate gap is forced to flow along the face of each plate 1007, and as the exit gap gets smaller by the collapsing plate stack, the reaction force caused by the escaping fluid increases exponentially as the cushion gets shorter. This increasing damper stiffness compensates for the decelerating velocity of the gun and maintains the deceleration force at a more constant level throughout the duration of the event. This provides for a self-compensating effect as described herein before with respect to other embodiments.

Since the total recoil energy is either dissipated into molecular friction, or as muscle effort to return the gun to the pre-event position, it is evident that by removing some of the energy as molecular friction in the recoil pad, the law of conservation of energy states that the rock-back motion will be decreased, and also, that the shooter will not have as much energy dissipated into the body.

Tests show a ⅙ or greater reduction in the rock-back position of the shooter. The highest recoil velocity of the event happens at the point where the projectile has left the gun, and the ejecta have reached atmospheric pressure. High speed video investigation of a high powered rifle shows that the ejecta have reached a state of equilibrium while the gun has travelled backwards not more that ⅛". This means that the shooter's flesh which would receive the recoil force without the recoil pad would only compress ⅛" before the recoil velocity of the gun was at its highest. In tests, a typical shotgun recoil velocity was measured to be 18 feet per second, and presumably, the shooter's flesh next to the gun's stock would be subjected to the G force commensurate with that acceleration. With the recoil pad in place, while the gun recoil velocity remained at 18 feet per second, the shooter's shoulder was measured to be accelerated to only 8 feet per second. Half the acceleration equals ¼ the energy, and the increased bearing surface on the shooter due to expansion of the fluid filled boot provides comfort in use.

There are several mounting methods currently used to mount recoil pads to shoulder fired guns. These include most simply screwing a rubber block or other form of padding to the gun stock with two screws. Other methods of holding the pad to the stock, and especially on hollow construction composite gun stocks, might be to cause mechanical interference between the pad and the stock with a bead or dovetail rib molded into the rubber pad engaging a bead or lip on the inside of the hollow gun stock section. On some hollow section composite stocks, there are provisions molded into the plastic to accept screws. Gluing is also an option.

Shoulder fired guns tend to be fitted or chosen for the length of pull according to each shooter. Length of pull is the distance from the trigger hand grip to the butt stock end rested on the shoulder. The correct length of pull increases the accuracy of shooting by permitting comfortable sight line alignment, having the recoil event be absorbed by the shooter in a comfortable position, and other factors. Since adjusting the length of pull requires modification to the stock and since the public has accepted a certain common length of recoil pad in conjunction with the store of guns in the public domain, and that a large number of firearms in the public domain are currently fitted with the accepted length of pad of 1-¼ inches, adapting our compensating damper recoil pad as a replacement would best be accepted if the length of the unit was similar in length. Further, in the case of mounting the compensating damper to shoulder fired guns, it would be beneficial to have a mounting system which would take up as little length as possible, in order to provide the longest effective dampening stroke length possible.

Since our compensating damper recoil pad is a fluid filled hermetically sealed bladder; the use of screws through the package is not possible. FIGS. 18*a* to 18*d* illustrate a mounting system for mounting our compensating damper recoil pad to shoulder fired firearms (1801) and including a base plate (1803) made of but not necessarily aluminum, which has a center recess (1809) sized to accept the sealing plate (1821) of the rubber bladder (1824), which contains the plates and fluid (1827). The base plate is fitted with two or more lever cams (1830) which are permitted to pivot on rivets (1831), and which have a tapered edge (1834) forming a cam ramp (1836). The sealing plate (1821) has recesses (1824) in the edge ready to accept the lever cam ramps (1836). The lever cams (1830) have an undercut (1839) which, when in the open position (1841) permit the recoil pad (1802) to move past the lever cams upon installation. Conversely, when the lever cams (1830) are closed (1851), the cam ramp engages behind the sealing plate recess (1824), and holds the recoil pad against the base plate (1803). The cam levers (1830) are inset in a pocket (1862) which, when the lever cams are closed (1851) fill the pocket very nearly (1867). The cam levers are made of but not necessarily stainless steel, and add a design aspect to the edge of the aluminum base plate by forming a line of dissimilar metal colors (1870). The base plate is, but not necessarily, anodized to have a dark blue color, meant to mimic gun bluing, which offsets the stainless cam lever color. The base plate (1803) has two slotted holes (1877) to accept screws.

In use, these screws mount the base plate to the gun stock (1881). Once the base plate is attached onto the gun, the recoil pad is then slid into position with the sealing plate engaging the recess in the base plate, and the cam levers pivoted to engage the cams behind the sealing plate recesses. The close tolerance between the sealing plate (1821) and the base plate center recess (1809) makes all of the lateral dynamic forces encountered by the gun during the recoil event, or during the normal transportation and handling of the gun transferred ultimately to the screws holding the recoil pad to the gun.

Referring now to FIGS. 14*a* to 14*c*, it can be appreciated that a compensating damper with an inter-plate fluid film arrangement can be adapted for use as a machine vibration dampening base.

As shown in FIG. 14, a new conical form of arrangement of the plates allows dampening in more than one geometric plane at once. This arrangement may be applied to all embodiments herein described. Similar to the other embodiments, the dampening base has a hermetic chamber 1104 filled with fluid. The plates are arranged to be alternately stacked with every other plate being deformed as described hereinabove, but the form of the plates are cone shaped 1121. The plates are positioned in a cup shaped receiver 1314, generally but not necessarily in the base, and are acted upon by a cone shaped plunger 1357 sealed to the cup with a diaphragm shaped membrane 1308. By adding externally adjustable springs 1362, and by increasing the tension of the external springs by means of jacking screws 1194 to have the same reaction force as the static load placed on the Machine Vibration Dampening Base (F), the internal travel distance of the unit can be adjusted. By reducing the tension force of the external springs below the static input load on mounting stud 1332, the fluid is forced out from between the plates, and cone to cup contact is established through the plate stack 1355. This makes the unit behave as one with the base, with no dampening action, and transmits the dynamic forces from the machine by mounting stud 1332 through a rubber ring 1331 or the like to the floor. By increasing the force of the external springs to provide a state of equilibrium, zero buoyancy from the static vertical input load is achieved. An internal clearance in the damper is then established if the mounting stud 1332 is subjected to a dynamic machine induced vertical change in load, acting in the same direction as the springs. The space vacated by the cone in this transient vertical motion allows fluid to enter between the plates, and as the oscillation induced in the mounting stud returns to net zero force with the springs, the fluid once entrained into the plates gets forced out, generating a dampening action on the half cycle oscillation which caused the extension of the dampener. Adding further spring tension causes the plates to have a fluid space at rest, and thus allows the unit to dampen if the load moves the cone closer or further to the plates and cup. Also, the cone shaped plunger will, if there is internal space available, allow motion lateral to the axis of the cone, and compress the oil films on one side of the cone. With the damper fully buoyant with external spring force, when the machine encounters dynamic oscillations or transient changes in position the dampening will occur in all directions, be it co-axial or cross-axis to the cone by the fluid being forced out from the inter-plate spaces.

The externally adjustable tension of the springs permits the inter-plate gaps of the dampening plates to provide more or less dampening at will. Since more space means retracting the cone further away from the cup, a larger orbit distance is permitted. The increased distance allows more energy to be dissipated per orbit by a longer dampener stroke, at the expense of allowing more machine travel. Conversely, the peak force that the damper proper transmits to the floor will be higher as the maximum permissible orbit is reduced. The perfect balance between maximum orbit and maximum force attenuation can then be easily established by adjusting the springs dynamically as the machine operates.

By varying the position of the cone vertically by increasing the external spring buoyancy, and by consequence making the allowable stroke longer, the machine would transmit less force through the damper but have a longer range of motion. Conversely, if the dampening cone was made to run closer to bottoming out on the receiving cup by decreasing the buoyancy of the external springs, then the total position orbit of the machine would be more tightly controlled, at the expense of reduced dampening effectiveness. A particularly good use for this embodiment is in the machine bases of vibratory bowl feeders, where the vibration signature of the machine by its very design transmits much energy to the floor, and where maintaining a constant output position of the bowl feeder is critical in maintaining the proper flow of parts to the next machine. Since the total orbit of the Multi-Axis Compensating Machine Damper can be externally adjusted by changing the spring force while observing the behaviour of the bowl feeder, then the best ratio of dampening-to-position-keeping can be discovered merely by adjusting the tension on the springs.

The energy transmitted to the floor in some installations has been reported to cause fatigue, and physical harm to the feet and legs of operators who must tend the machines for long periods of time and whom are subjected to the vibrations induced into the floor. In one case study, where vibratory bowl feeders were in use, the energy transmitted to the concrete floor could be felt in the entire production facility. Concrete floors are rigid in nature and the energy travels considerable distances. Tests using the Multi-Axis Compensating Damper Machine Vibration Bases showed a 94% decrease in energy transmitted to the floor.

FIG. 15 illustrates a still further adaptation of the compensating device. More particularly, FIG. 15 illustrates a compensating damper energy dissipating link suited for use in a vehicle, such as military vehicles. The energy dissipating link or unit may comprise a sealed metallic canister 1503 holding a stack of weavy and flat plates and with an external tubular wall of a thickness capable of supporting the normal static and dynamic forces of the occupant's cabin 1554 in heavy armored vehicles; each unit may serve to act as the corner attachment point 1592 between the pressure 1502 hull and the occupant's cabin 1554. Each unit could have two internal working faces 1553 between which to hold the fluid filled flat plates 1562. One end could have a suitable joint to permit mounting 1511, while the other could have a rod type arrangement projecting through the craftily machined end of the tube 1566. This machining detail in conjunction with carefully chosen metallurgies and heat treating, would form a weak point 1528 in the tube end which would cause a stress concentration point to fracture when a force exceeding the normal operation of the vehicle, and in particular to the forces encountered in an explosion were encountered, and allow the rod to be run into the canister 1591. This would permit gaining access to the desired dampening effect. The fluid filling the canister 1558 could be confined hydrostatically if the fluid consumed all the internal space, and hinder the weak point 1528 from breaking. A controlled volume of inert gas 1594 in the initial filling of the unit provides a compressible internal space to permit the change in internal volume. At the point of fracture, the breech in the canister 1503 would permit the fluid escaping from the inter-plate gaps to flow out 1533. Biodegradable fluid, such as glycerine would normally be employed. One advantage of the sealed canister provides the maintenance free guarantee of performance of the unit only in case of a catastrophic force event. The unit's dampening effect would limit the acceleration forces projected onto the occupant's cabin and help to limit injuries to the occupants therein by shielding the occupant's cabin from the direct acceleration of the blast and that of the pressure hull's acceleration. The extremely high rate of energy conversion permits the integration of high capacity force limiting devices in compact spaces.

FIG. 16 illustrates a still further possible application of an inter-plate film damping arrangement. More particularly, FIG. 16 illustrate an electronic component shock dissipating mount which may comprise a series of dampening units 1604, typically mounted at the corners of a base plate 1611, and comprised of sets of opposed conical form pistons 1615, sealed into an enclosure having opposed cup shaped internal surfaces 1673, and sealed hermetically with an elastomeric diaphragm 1684. The base plate 1611 acts as a seismic mass suspended in free space by the dampeners, and connected through the dampers to the machine housing 1621. The base plate provides a chassis to which the sensitive electronic components are mounted 1667. In use, the base plate, having inertia and being slung by the normally compliant dampers 1615 exhibits a low base harmonic frequency. The mass of the base plate and of the electronics mounted thereto, in conjunction with the compliant nature of the dampers at rest permit the relative orbit of the machine without inducing strong acceleration forces to the base plate. The configuration reduces greatly any vibration or transient accelerations which the machine housing is subjected to, to accelerate the base plate.

The plates 1644 may be generally conical in form. Each alternating plate may be deformed 1647 to provide inherent spring force. This spring action forces the plates to separate, allowing fluid to enter the inter-plate gaps. There are a series of plates in each cone assembly 1615. The inherent spring force of the sum of the plates in all of the dampers provides enough force to overcome the mass of the plate and of the mounted electronic components, such that the space available for fluid between each plate is roughly equal, no matter which sense the object is mounted in relation to gravity. In other words, the at-rest position of each conical damper pair is roughly centered in its stroke, so that any extraneous force acting to accelerate the base plate will compress fluid out of the inter-plate spaces and, thus, dampen the forces acting on the base plate. Fluid normally displaced by the advancing of the conical pistons towards the cups in one direction will flow to the other side.

Another aspect of this embodiment is the reticence of the base plate to oscillate in harmonic resonance to any outside frequency. This is due to the high rate of molecular shear of the fluid as it is being forced out of the relatively thin spaces between the plates. The unit converts a high percentage of relative motion between the base plate and the machine base to heat. Tests show a conversion rate of motion to heat of more than 94%.

FIGS. 17 illustrate an improvement over the embodiment shown in FIG. 1. As shown in FIG. 17a, the embodiment of FIG. 1 includes a series of flat plates 1701 mounted about a single central shaft 1704. The embodiment shown in FIGS. 17b to 17e essentially differs from the embodiment shown in FIGS. 1 and 17a in that the central shaft is replaced with multiple pins extending from each working end plate 1723, and engaging the plate stack partially from each face 1733. As can be appreciated from FIG. 17a, one limitation of the single center shaft orientation is the stroke distance permissible 1706 in relation to the total length of the damper 1708. In the single center shaft configuration, the compressed plate stack thickness plus the total fluid gap thickness plus a reasonable guide shaft engagement length in the receiving end working surface plus the stroke distance added to the receiving end, plus the opposing working plate length, dictates the minimum damper length. The center shaft in this configuration must project past the distance taken up by the plate stack and engage the opposite working face, in order to guide the plates as the fluid is forced out of the gaps. The challenge is to provide as many plates as possible in any given space. This optimization of plate thickness to envelope size gives rise to the need for this new arrangement.

In the embodiment shown in FIGS. 17b to 17e, the plates are guided by an array of pins forming a hole-circle about the center of the plates 1714, and the pins 1723 projecting from one working face of each end working surface occupies every other hole 1712. The length of engagement of the pins into the plate stack of the damper at rest 1733 emanating from one face are less than the total distance of travel of the damper stroke 1731. Further, if the pins emanating from one face 1788 were permitted to enter into corresponding recesses 1734 in the other end working surface, then the stroke distance permissible 1731 would be further increased while reducing the overall length of the damper 1739. This new arrangement thus provides for a greater stoke.

The above description is meant to be exemplary only, and one skilled in the art will recognize that changes may be made to the embodiments described without departing from the scope of the invention disclosed. It is understood that the features of any given one of the various described embodiments could be interchangeably integrated to the other described embodiments. That has the features described in connection with a given embodiment could be used in combination with the features of any other disclosed embodiments. Modifications which fall within the scope of the present invention will be apparent to those skilled in the art, in light of a review of this disclosure, and such modifications are intended to fall within the appended claims.

What is claimed is:

1. A gun recoil pad comprising a compensating damper having opposed working end faces, a hermetically sealed chamber between the working end faces, a plurality of viscous fluid films separated by a set of plates disposed in the chamber between the working end faces, characterized in that each viscous fluid film belongs to one of at least two different film thickness zones disposed transversally across the set of plates, each of the different film thickness zones providing a different resistance response when acted upon by an outside force exerted on at least one of said opposed working end faces, wherein the set of plates is disposed as a stack inside the chamber, the chamber being at least partly formed by a hermetically sealed elastomeric boot adapted to be mounted to a butt stock of a gun, the boot being filled with the viscous fluid and pressurized, the internal pressure acting to cause tension in the boot.

2. The gun recoil pad defined in claim 1, wherein the set of plates comprises a series of alternately stacked wavy and flat plates.

3. The gun recoil pad defined in claim 1, wherein the boot is closed at one end thereof against the butt stock of the gun by at least one plate clamping the elastomeric boot.

* * * * *